United States Patent

Rao

[11] Patent Number: 6,040,650
[45] Date of Patent: Mar. 21, 2000

[54] STATOR WITH COPLANAR TAPERED CONDUCTORS

[76] Inventor: Dantam K. Rao, 2212 Lynnwood Dr., Schenectady, N.Y. 12309

[21] Appl. No.: 09/163,171

[22] Filed: Sep. 30, 1998

Related U.S. Application Data

[63] Continuation-in-part of application No. 09/106,773, Jun. 30, 1998.

[51] Int. Cl.[7] .................................................... H02K 1/22
[52] U.S. Cl. .......................... 310/268; 310/254; 310/208
[58] Field of Search .................................. 310/268, 237, 310/208, 254

[56] References Cited

U.S. PATENT DOCUMENTS

| | | | |
|---|---|---|---|
| 3,906,622 | 9/1975 | Sakano et al. | 29/597 |
| 4,107,587 | 8/1978 | Ban et al. | 318/43 |
| 4,319,152 | 3/1982 | van Gils | 310/201 |
| 4,484,097 | 11/1984 | Kanayama et al. | 310/268 |
| 4,551,645 | 11/1985 | Takahashi et al. | 310/46 |
| 4,756,075 | 7/1988 | Dolgas | 29/596 |
| 4,916,345 | 4/1990 | Tong | 310/208 |

OTHER PUBLICATIONS

P. Campbell, "Principles of a Permanent–Magnet Axial–field d.c. Machine", vol. 121, No. 12, Dec. 1974, pp. 1489–1494, Proceedings of the Institute of Electrical Engineers.

F. Profumo, Z. Zhang and A. Tenconi, "Axial Flux Machines Drives: A New Viable Solution for Electric Cars", vol. 44, No. 1, Feb. 1997 pp. 29–45, IEEE Transactions on Industrial Electronics.

*Primary Examiner*—Thomas M. Dougherty
*Assistant Examiner*—Joseph Waks
*Attorney, Agent, or Firm*—Clyde I. Coughenour

[57] ABSTRACT

The torque produced by an electric machine of the axial air gap type is increased by pressing or forming the active sectors of the radial coil sections, essentially coplanar, and by using nonuniform cross-section conductors for the radial active sectors of the coils. One of the active sectors of a leading radial coil section and one of the active sectors of a trailing radial coil section are confined within the central open area formed in a first coil. The gap required between the permanent magnets of rotors, necessary to accommodate the axial thickness of a stator, is reduced to little more than the axial thickness of a single radial section of a stator coil in the active area of the coil. The stator coils can be made by joining winding sheets together. The winding sheets can be made by forming coils from flat, thin conductor coils on carrier films. Two of the winding sheets thus formed can be superimposed, aligned, pressed and laminated together to form the desired stator laminate, with or without further treatment. By forming the radial coil sections active sectors of radially increasing conductor widths, almost all of the lines of force passing between the rotating permanent magnets will be cut by the radial sectors of the stator coils, thereby fully utilizing the magnetic field created by permanent magnets to produce torque.

17 Claims, 6 Drawing Sheets

STATOR WITH COPLANAR TAPERED CONDUCTORS

CROSS-REFERENCE

This application is a Continuation-in-Part of U.S. patent application Ser. No. 09/106,773 filed Jun. 30, 1998.

BACKGROUND OF THE INVENTION

1. Field of the Invention

This invention relates to windings for the stators of electric machines such as motors and generators of the axial gap or radial gap type. Both brushless and brushed type DC motors and generators are improved by having plural coils assembled arcuately adjacent one another with the active sector of the radial sections of the coils in an essentially coplanar configuration and with the radially active sector having tapered conductors that increase in width in the radial direction.

2. Description of Related Art

Electric motors and generators of the axial gap type are well known. They employ motors that deliver axially directed magnetic fields to stationary radially directed electrically conductive coils of wire. It is common to have rotors with permanent magnets of alternate polarity with the magnets of opposite or opposing fields attracting each other, concentrating the magnetic field across a stator sandwiched in between the permanent magnet rotors. In the motor mode, electric current is passed through the stator windings. Currents flowing through the radially positioned conductors intersect the axial field created by the magnets to produce a torque that rotates the motor rotor. In the generator mode the magnets are rotated by an external prime mover. When this happens, the rotating magnet's axial field interacts with the radial conductor coils to induce a current flow in and voltage across the conductor coils. FIG. 1 illustrates a prior art configuration showing the direction of current, magnetic field and resulting force. FIG. 2 illustrates a common prior art phase coil arrangement. The phase coil is a continuous conductor wound flat in a closed loop form. It generally consists of "active sectors" or areas (i.e., those portions of the coil that extend radially out from and perpendicular to the axis of rotation of the rotor and that cross the magnetic field created by the magnets) and "inactive sectors" or areas (i.e. those end windings or portions of the coil that are outside the magnetic field which connect the active sectors). The current in the active portion of the coils flows radially outwardly on one side and radially inwardly on the other or opposite side of the coil.

The basic theories pertaining to, and several illustrations and versions of, axial gap machines are set forth in an article by P. Campbell in *Proceedings of the Institute of Electrical Engineers,* Vol. 121, No. 12, December 1974, pages 1489–1494, and an article titled "Principles of a Permanent-Magnet Axial-field d.c. Machine," by P. Profumo, Z. Zhang and A. Tenconi in *IEEE Transactions on Industrial Electronics,* Vol. 44, No. 1, February 1997, pages 29–45; which are incorporated herewith by reference.

FIG. 1 illustrates the interaction of the magnetic fields and currents under consideration in the prior art axial gap motor 10. Two rotating permanent magnet disks 1, 2 sandwich a stator ring 3 separated by two air gaps 4, 5 as they rotate about an axis 7 of a rotor axle 12. The rotating magnet rings 1, 2, have alternately poled flat permanent magnets, typically of sector shape, which produce an axially directed magnetic field 6 across the air gaps. The rotating magnet disks are supported by iron rings 13, 14. The magnetic gap is the distance between the two facing surfaces of the rotating permanent magnets. The stator ring 3, supported by a housing 15, contains sets of phase coils. Radially directed current 8 in the active part of the coil conductors interacts with the axially directed magnetic field 6 to produce a tangentially directed force 9 which creates the torque that drives the motor.

FIG. 2 illustrates a typical prior art arrangement of sector-shaped coils 20. A rotor rotates about an axis of rotation 7 in an opening 25 provided in the stator. The rotor has sector-shaped permanent magnets on it with the inner radial extent of the magnets 28 and the outer radial extent of the magnets 29 indicating where the magnets rotate past the coils 20 of the stator. The north poles and south poles of adjacent magnets alternate around the rotor. Three phase coils A,B,C are used together with three phase electrical machines. Although there is continuous relative motion between the magnets and coils in the region occupied by the permanent magnet pole pairs, N-pole,S-pole, the coils are shown directly over the pole pairs. The coils each have an inner inactive section 27 and an outer inactive section 26, referred to as end windings. Radial sections 22$a$, 22$b$ extend between the inner and outer sections of each coil. An open area 24 is formed between the coil sections. Three of the radial sections 22$a$ of the coils are shown crossing the magnetic field created by the north pole magnets while their opposite radial sections 22$b$ are crossing the magnetic field created by the south pole magnets. The active sector of the coil radial sections is that portion of the radial sections 22$a$, 22$b$ that extends between the magnet inner radial extent 28 and the magnet outer radial extent 29.

When using uniform cross-section conductors these "empty areas" 24 equal $1_r/(2r_i)$ fraction of the conductor area where $1_r$=active length of conductor 22 under the rotating magnets and $r_i$=inner radius 27 of the coil. For a typical design with $1_r=r_i$, this implies that 50% of the space available for conductors in the stator is not used to produce torque. This ratio of "empty area" to "conductor area" is called the "spoke fill factor." This loss of useful area is unique to axial motors. It results in a loss in torque that is in addition to the conventional "shape fill factor", that defines the loss of area due to the shape of the wire, and the "insulation fill factor", that defines the loss of area due to the insulation coating on the bare copper wire. The combination of "shape fill factor" and "insulation fill factor" is called the "copper fill factor." As an example, round wires have a "copper fill factor" of 0.7. This loss coupled with a "spoke fill factor" of 50% yields a total fill factor of (0.7)(0.5)=0.35 or 35% for round wires. The situation is worse if Litz wires are used. Litz wires have typical "copper fill factors" of 0.4 to 0.55. This coupled with the "spoke fill factor" of 50% can yield a still lower total fill factor of (0.4)(0.5)=0.20 or 20%. This implies that only 20% of the available area is used to produce torque. As a result, the torque produced is significantly lower than what is possible when the entire available geometric area is used to produce torque.

In order to increase torque, many axial gap machines use three phase windings. The coils are arranged to form wave windings and phase coil windings. Typically three phase coils are positioned under each permanent magnet pole. Two of these coils are energized at any time by connecting them in a wye or a delta mode, thus having conductors crossing two-thirds of the pole pitch for torque generation. Pole pitch is the arc length from the center of a north pole to the center of a south pole measured along the mean radius of the permanent magnets.

Many of the problems solved by the present invention have been addressed by the prior art. Ban et al, U.S. Pat. No. 4,107,587, issued Aug. 15, 1978, address the problem created by increasing the gap between magnets in a three-phase motor. The coil(s) of one phase are shifted by 180° from the next phase and not superimposed. A. Tong, U.S. Pat. No. 4,916,345, issued Apr. 10, 1990, uses spaced tabs to connect adjacent windings. Takahashi et al, U.S. Pat. No. 4,551,645, issued Nov. 5, 1985, use loop-like windings on a stator in a disc type motor using permanent magnets with various electrical arrangements. Windings that utilized the shape of a wave having three conducting sides are well known and described in the literature. U.S. Pat. No. 4,319,152 to A. van Gills, issued Mar. 9, 1982, discloses laminated coil windings formed by multiple layers of thin electrical conductive material shaped so that current flowing through them generates a magnetic pole at three of four cross-sectional sides. The laminated coil is formed of layers of patterns arranged to provide a magnetic pole at all four sides.

In such prior art three-phase motors, the flat armature coils, superimposed in three layers, result in an increased axial thickness of the stator. This three-fold increase in thickness of the stator greatly increases the gap between the permanent magnets. This configuration weakens the strength of the magnetic field which passes between the magnets across the coils. As a result the torque is greatly reduced. Reduced field strength requires significantly larger and/or more powerful permanent magnets or increases the current required to produce a given torque, which in turn reduces the efficiency because of increased ohmic losses.

SUMMARY OF THE INVENTION

The present invention reduces the air gap between magnets by reducing the axial thickness of the stator located between rotating magnets. The active radial extent of adjacent coils are placed inside the central coil open area of adjacent coils using conductors that have an increasing width in the radial direction. The preferred stator coil arrangement is formed by laminating together two phase coil sheets each having a number of phase coils arranged in sequence around the periphery.

The tapered conductors of the coils eliminate voids between conductors, so that during rotation, conductor wires are continuously crossing all or almost all of the magnetic lines of force extending between the permanent magnets across the coil conductors during relative movement between the rotor and stator, and also increase the number of conductors that can be used in a coil. By overlapping coils, the tapered conductors will also fill in the void created by the central area left open when a coil is formed as well as the voids that inherently exist between uniform cross-section conductors when they are fitted like radial spokes around an armature periphery. By bonding the adjacent tapered conductors together with a material that seals as well as insulates the adjacent conductors, they form a fluid impermeable section. By overlapping these sections and forming a seal between the adjacent and overlapping sections, they form a fluid-impermeable plate. By using two such fluid-impermeable plates back to back, a cooling fluid passage can be provided. Motors using the structure of the invention can be used in many applications such as locomotive traction motors, hybrid electric drives, underwater vehicles, tanks, ships, aircraft generators, stationary power sources, disc drives, etc.

The phase coils are formed from thin conductor foils or plates. Preferably plural coils are formed in foils by known manufacturing processes on carrier or support films with the standard void or open area within each coil. The term "foil" as used does not represent or imply any specific thickness and is here used interchangeably with "plate." The arcuate width is used as a measure of the number of degrees that a radial section of a coil or open area within a coil extends around the total 360 degree extent of the stator. The central open area has an arcuate width that equals essentially the arcuate width of two coil radial sections active sectors. The carrier films each have a plurality of the coils spaced arcuately around a central open area. They are here referred to as "winding sheets." Several of the winding sheets, preferably two identical sheets, are superimposed and rotated relative to one another to align the coils so that each central open area of each coil on one winding sheet is covered by the adjacent active sectors of the radial coil sections of the second winding sheet. The sheets are then pressed and laminated together so that each coil active sector is essentially coplanar with all other coil active sectors. These winding laminations are used as the stators for electrical machines as they are, or after further treatment. For example, the winding laminations could be encased in a rigid epoxy. Two of the winding laminations can be spaced apart and used together with a cooling fluid passed between them for cooling during high temperature applications. The winding laminations of the invention do not necessitate the increase in the magnetic gap that stacked coils do. The increased magnetic field results in a higher torque capacity of the electric machine.

DESCRIPTION OF THE PREFERRED EMBODIMENTS

The phase-coil type windings of the invention are characterized by multiple sets of coil patterns formed from conducting foil or plate material preferably on a carrier film. The coils can be manufactured independently or in combinations. The preferred manufacture is to have a conducting foil, such as copper, adhered directly or by an adhesive to a carrier film. The thin carrier film is attached to the conductive foil and acts as a backing that supports and prevents movement of conductors during handling, manufacture and use. The conducting foil can selectively or completely cover the carrier film. The coils can be formed by photochemical machining, electro-discharge machining, water-jet machining, cutting, etching, laser or otherwise, to remove select portions of the conductor to form the coils for use on or as a stator. While each coil can be formed on a separate sheet, two or more coils can be formed arcuately around a central point on one sheet. It is preferred that all the coils be formed and spaced equally around two sheets that are subsequently laminated together. A first pattern is used to form a first set of phase coils arranged arcuately around the periphery of a first sheet and the same or a second pattern is used to form a second set of phase coils that are also arranged arcuately around the periphery of a second sheet. The resulting first and second pattern or winding sheets are preferably identical. The second sheet is positioned above the first sheet with the arcuately extending active coil sectors of adjacent coils inside the open spaces or areas formed in the central areas of the first sheet coils. The sheets are pressed and laminated together so that the active sectors of the coils are pressed into an essentially coplanar configuration. The resulting phase coils can be connected to form typical three-phase windings. When current is passed through the windings, two sides of phase coils under a north pole will be energized radially outward while the other two sides under the neighboring south pole will be energized radially inward. The interaction of the currents and the magnetic fields will result in torque that drives the motor.

Figure 3:
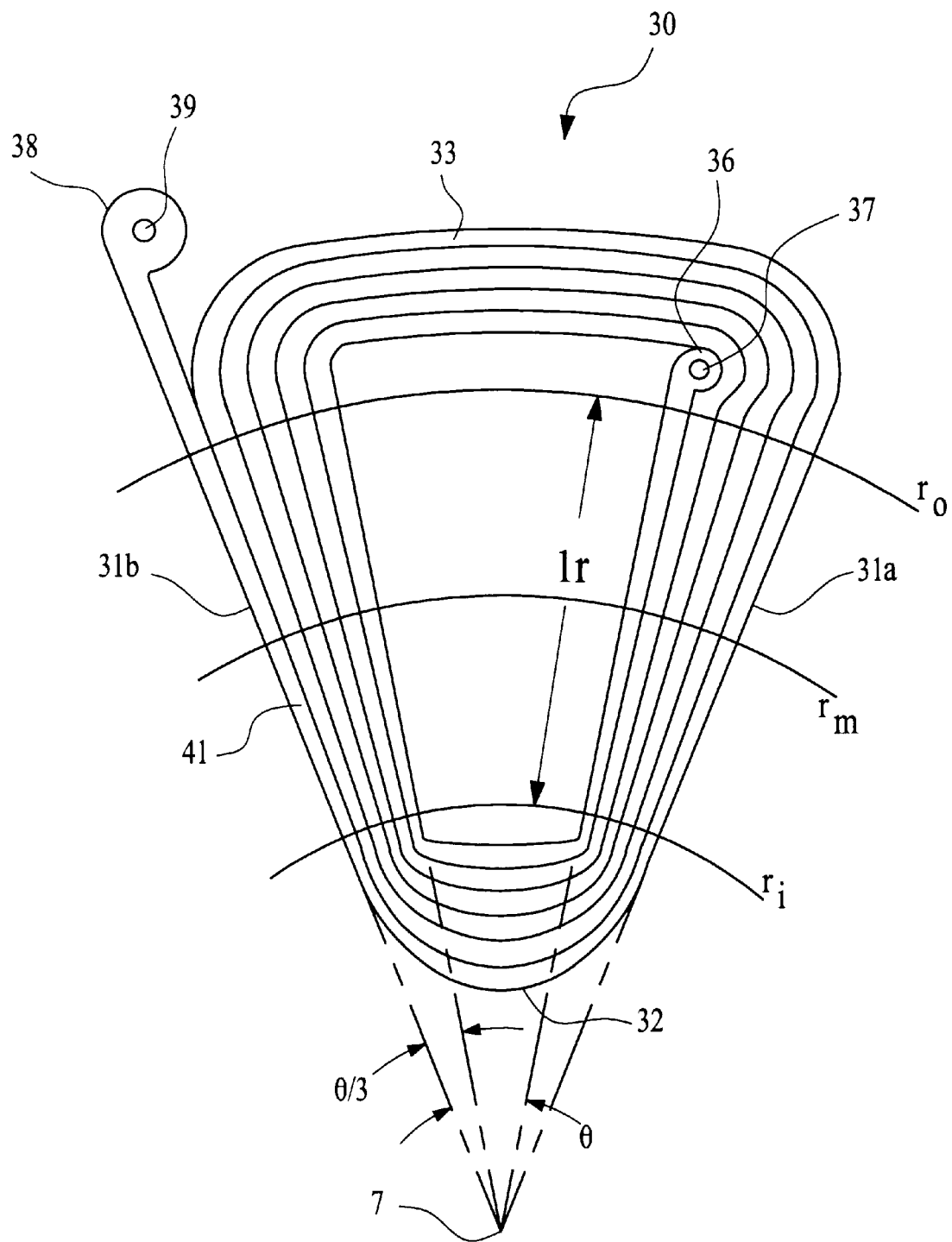
FIG. 3 is a front view of a phase coil of the invention.

FIG. 3 shows a front view of a single phase coil 30 with electrical inlet and outlet points. The phase coil 30 has two radial sections 31a, 31b between an inner section 32 and an outer section 33. The coil 30 is made of a single conductor separated by an insulation medium 41. The insulation spacings are designed to adequately protect the conductor against short-circuiting. The phase coil has a beginning connector 36 and ending connector 38. The beginning and ending connectors 36,38 have alignment holes 37,39 respectively. The alignment holes are used to position the coil and/or film or winding sheets during initial manufacture, and to position the ends for current flow connections for and during operation. As can be seen, the tapered electrical conductors or wires used to form the phase coil 30 radial sections 31a,31b have an increasing width as they progress or extend in the radial direction from the inner radius $r_i$ of a stator to the outer radius $r_o$ of a stator and perpendicular to the axis of rotation 7 of a rotor and center of the stator. The ratio of increase is preferably such that lines extended from both sides of a conductor will intersect at the center of rotation 7 of a rotor and/or the center of the stator, i.e. the conductors would come to a point if their sides were extended to the axis of rotation. The inner and outer sections or end windings 32,33 can be of uniform width as they extend along the inner radius $r_i$ and outer radius $r_o$ and run essentially in lines around the axis of rotation of the rotor. The width of a conductor is the distance between the sides of the conductor at any point along its length. If desired, the cross-sectional area of the conductors can be maintained constant to give a uniform resistance to the flow of current. This can be done by increasing and decreasing the thickness of the conductor as the width is decreased and increased respectively. The thickness of a conductor is the distance between the top as shown and bottom, hidden below the top, of the conductor at any point along its length. Alternatively, the thickness of the conductor can remain constant as the width expands, as the increasing cross-sectional area will not interfere with the operation of the coil so long as the cross-sectional area is sufficient to carry the current load. The width of the end windings 32,33 is preferably such that the ohmic loss in them is reasonably low relative to that of the radial sections 31a, 31b or active sectors of the coil. The radial thickness of the conductors can be changed by having the conducting material on the original carrier film thickness uniformly decrease in the radial direction.

Figure 1:
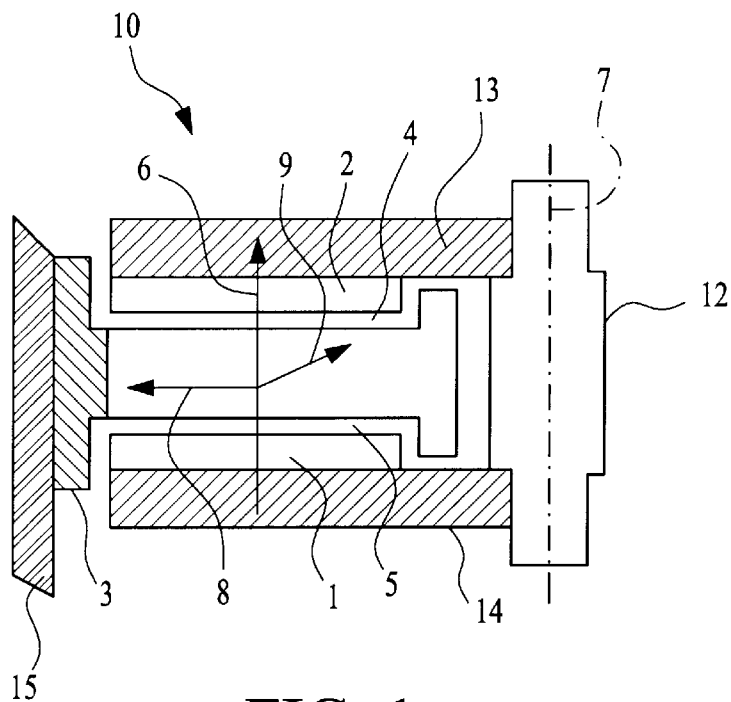
FIG. 1 is a sectional top view illustrating typical prior art flux and force lines.
Figure 2:
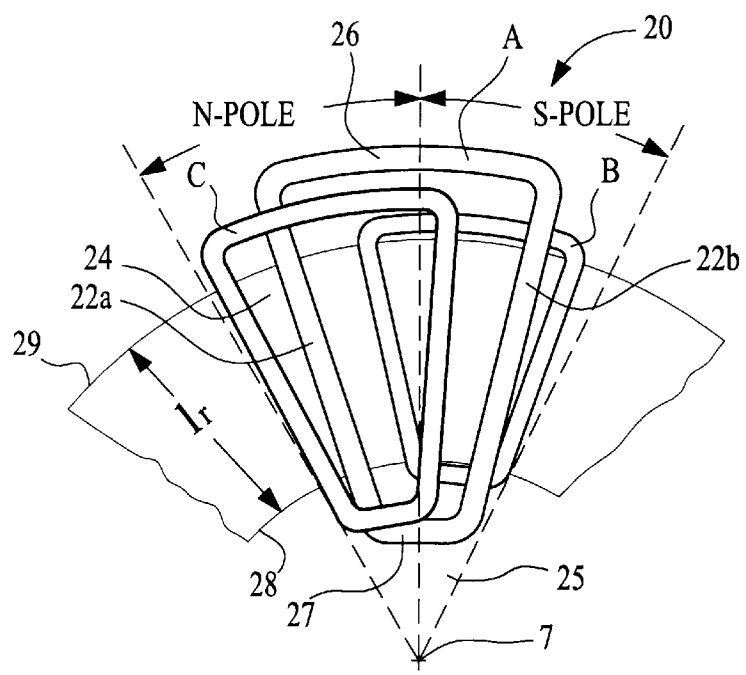
FIG. 2 is an end view of a typical prior art stator configuration.

A somewhat arbitrary inner radius $r_i$, median radius $r_m$, and outer radius $r_o$ of the permanent magnet rotation are shown on the coil of FIG. 3. The inner radius essentially represents the innermost extent of the permanent magnets of the rotor as the rotor passes by the stator coils. The outer radius essentially represents the outermost extent of the permanent magnets of the rotor. The portion of the coil 32 beyond and inside radius $r_i$ and the portion of the coil 33 beyond and outside the outer radius $r_o$, and windings, are the essentially inactive portions of the coil 30 that do not produce torque. The portions of the radial sections of the coils between the inner and outer radii $r_i,r_o$ are the active sectors of the coil radial sections. The radial length of the active sectors or distance is shown as $1_r$ in FIG. 2, between the magnet inner radial extent 28 and outer radial extent 29, and in FIG. 3 between $r_i$ and $r_o$.

With a constant diameter or uniform cross-section conductor, the number of wires that can be placed side by side around the periphery formed by the inner radius and extend radially outward from the inner radius is limited by the peripheral width of the conductor. Prior art axial gap motor designs are limited by the finite number of uniform conductors that can be placed around the periphery formed by the inner radius due to this space limitation. With the tapered conductors, the number of conductors that can be placed side by side at the median radius and extend radially outward from the inner radius is double that of a uniform cross-section conductor of the same diameter.

In a typical 3-phase motor, the stator contains three phase coils, usually labeled phase A, phase B, and phase C. As shown in FIG. 3, the phase coil has a winding 30 with an angle θ and an angle θ/3 set forth. The angle θ extends from the left-most radial conductor wire on the left section of the coil to the left side of the right section of the radial conductor wire of the coil. The angle θ/3 extends from the left-most radial conductor wire on the left section of the coil to the right-most radial conductor wire on the left section of the coil, and corresponds to the typical phase A. The remaining portion of the coil angle θ, or ⅔ θ, is the central portion of the coil. This portion of the coil, the open or void central area of the coil, contains the remaining typical areas for phases B and C. By overlapping three phase coils, as depicted or illustrated in FIGS. 2 and 5, the entire area can almost be completely covered with active conductor wires. The only area not covered by the conductor wires is the very small area between the wires that is filled with insulation.

Figure 4A:
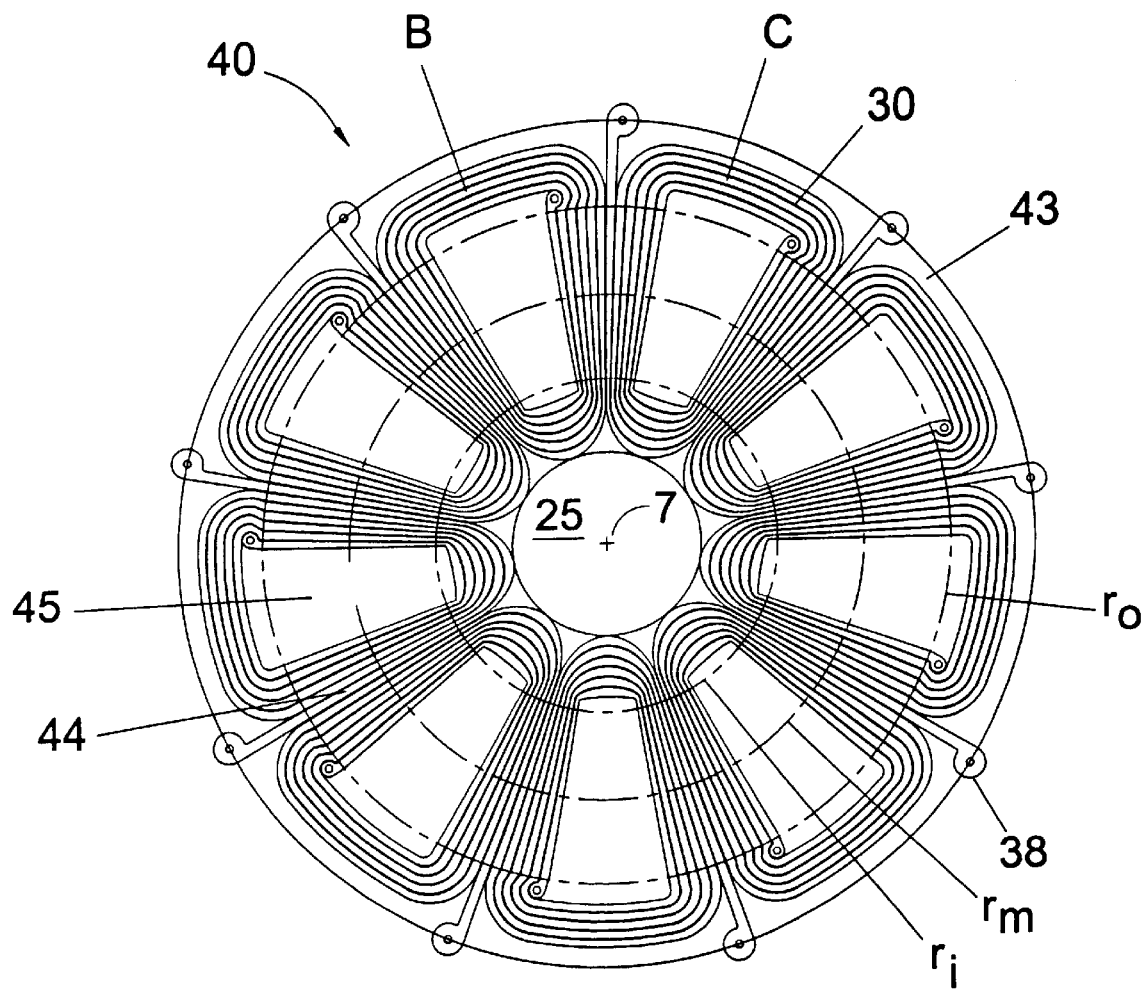
FIG. 4 is a top view of two winding sheets prior to lamination.
Figure 4B:
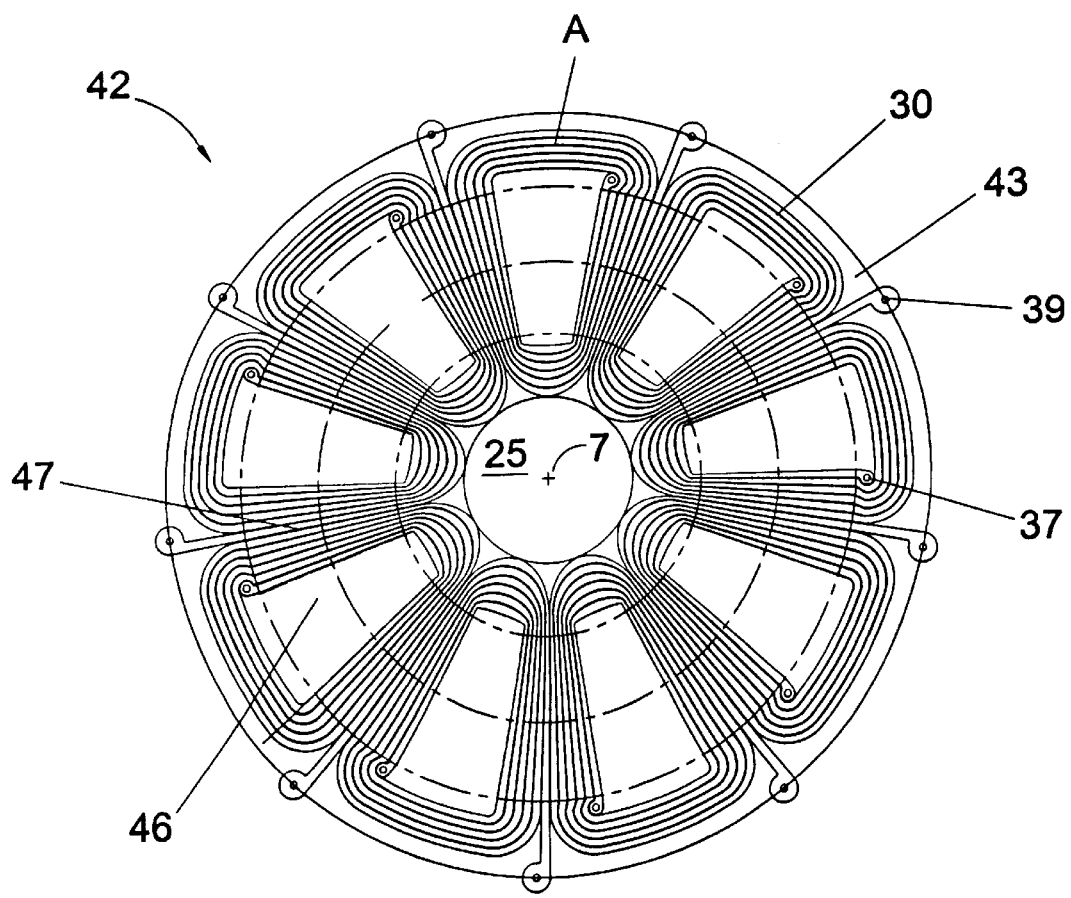

FIG. 4a shows a first winding sheet 40 and FIG. 4b shows a second winding sheet 42. The sheets are identical. A series of coils 30 are uniformly spaced radially about a central point or axis of rotation 7 within an opening 25. The coils 30 are formed on a carrier film 43. Each carrier film 43 is shown with nine coils 30 adjacent each other around the carrier film. The inner radius $r_i$ and outer radius $r_o$ are shown. These represent the inner and outer extent the permanent magnets reach as they rotate on the rotor. The median radius $r_m$ represents the mid or median extent of the rotating magnets and the openings in the central area of the coils. Each winding sheet is made of a thin foil of conducting material on a carrier film that has several phase coil patterns formed on it. At the mean radius $r_m$, one phase coil radial section width occupies one-third of a pole pitch while the cavity or opening width occupies two-thirds of a pole pitch of each coil. A pole pitch width is equal to 3 times the width of one radial section of the coil at the mean radius of the coil $r_m$. The second winding sheet 42 is identical to the first winding sheet 40 except that it is shifted by an angle equal to the arcuate width of the coil central opening and the arcuate width of the radial sections of adjacent coils. The center of the coil open area 45 of the first winding sheet 40 is rotated about the axis of rotation 7 to be in alignment with the center adjacent coil radial sections 47 of the second winding sheet 42 at the same time the center of adjacent coil radial sections 44 of the first winding sheet 40 are aligned with the center of the coil open area 46 of the second winding sheet 42. The open area 45 arbitrarily represents the open area of a first coil and the adjacent radial sections 47 represent a second leading coil section adjacent to a third trailing coil section that both fit within the open area 45 of the first coil. This alignment can be brought about by the use of alignment pins, spaced about a central point such as 7, on a fixture. The fixture pins, appropriately spaced, will engage one or more of the pin alignment or connector holes 37 and/or 39 of the first winding sheet 40 beginning connector 36 and/or end connector 38 and one or more of the alignment holes 37 and/or 39 of the second winding sheet 42 beginning connector 36 and/or end connector 38. When aligned properly, the conductor region of the second winding lamination will fit inside the open area of the first winding sheet. After alignment, the two sheets are pressed and laminated together to form a winding lamination.

Figure 5:
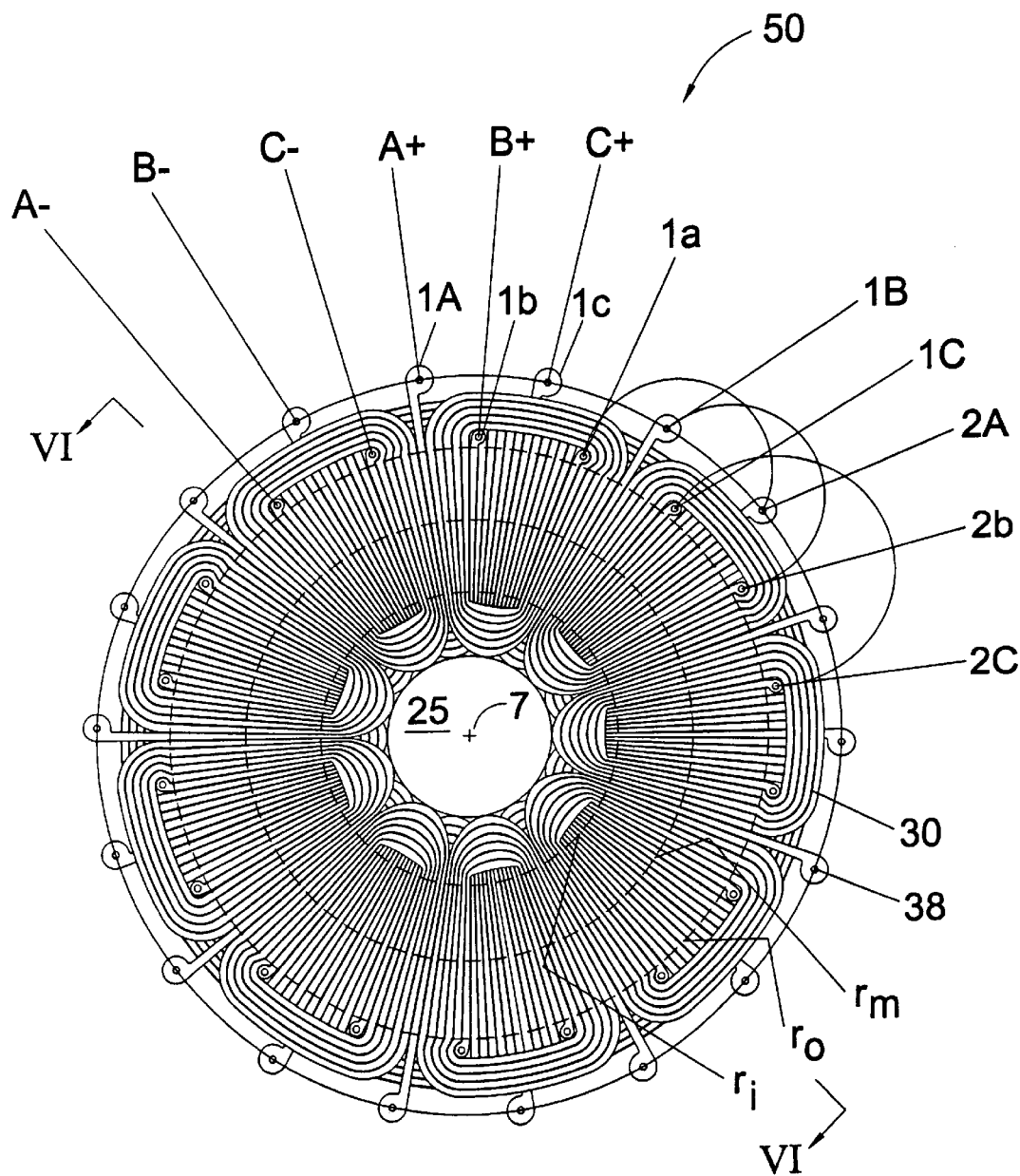
FIG. 5 is a top view of two winding sheets laminated together.

FIG. 5 shows the winding lamination 50 that results from laminating together the winding sheets 40,42. The coil sectors are shown extending around the entire 360 degree extent of the stator. Because the active coil sectors of the second winding sheet fit inside the cavity or open area of the first winding sheet, the coil thickness of the stator along the coil radial section active radial sectors is equal to the thickness of one coil radial section, (i.e., in the area the permanent magnets on the rotor pass the stator coils the thickness of the stator is essentially that of one coil alone). In the end-winding region or area the total thickness of the windings of the winding laminations is at least twice that of the thickness in the active radial coil sectors. In this configuration, the electrical connections can be made easily to the phase coils. A conventional wye or delta winding arrangement can be made. In the figure shown, the stator consists of 6 sets of phase coils 1A, 1B, 1C, 2A, 2B, 2C, etc. The end connections of phase coil A are labeled as 1A and 1a, those of phase B are labeled as 1B and 1b, those of phase C are labeled as 1C and 1c, etc. The phase coil 1A is connected in series with phase coil 2A using a short conductor to connect end 1a with end 2A. Similarly, the phase coil 1B is connected in series to phase coil 2B by using a short conductor to connect end 1B with end 2b. The phase coil 1C is connected in series with phase coil 2C by connecting ends 1c with 2c. This connection pattern is repeated around the winding. When 6 phase coils are connected in such a pattern series, the connections for each phase, A+ and A−, B+ and B− and C+ and C− terminate outside the stator. The ends A−, B− and C− can be shorted to form the neutral of a wye winding. When the connections are made according to this diagram, the motor will operate in a three-phase wye mode in which the torque is generated by two phase coils at any given time.

Figure 6:
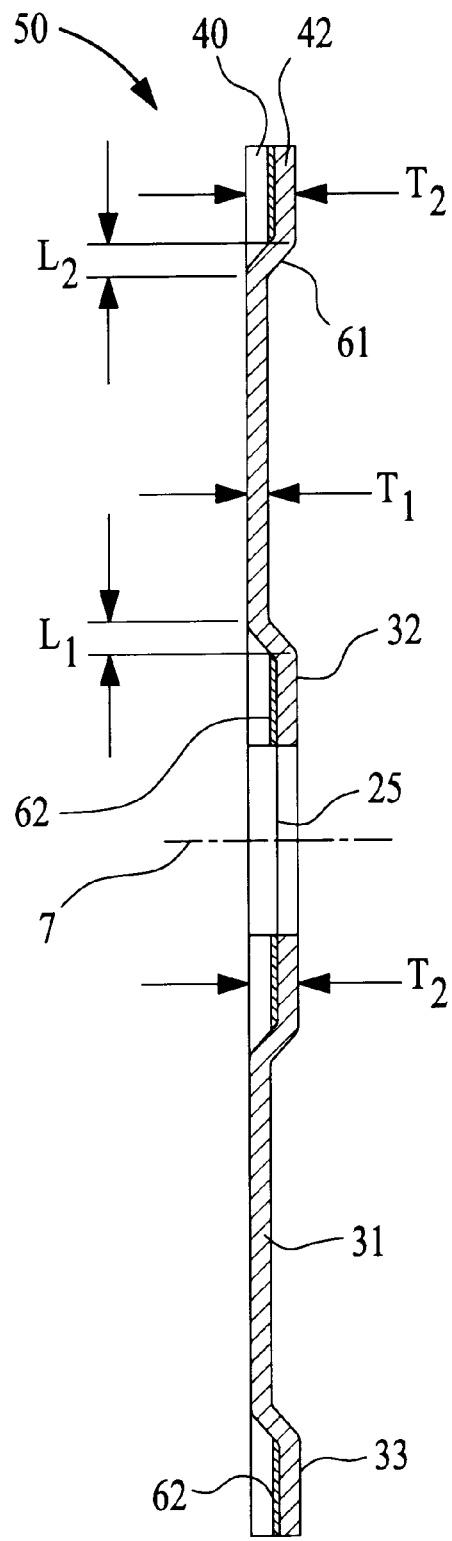
FIG. 6 is a sectional end view of the laminated sheets taken along section line VI—VI of FIG. 5.

FIG. 6 shows a cross-sectional end view, taken along the section line VI—VI of FIG. 5, of the winding sheets superimposed and laminated to form a winding lamination 50. The radial sections of the coils are pressed or deformed to form an essentially coplanar active sector of the coil radial sections 31 having a thickness $T_1$. The end windings 32, 33 of the second sheet 42 coils are separated from the end windings of the first sheet 40 by an insulation 62. The end windings of the second winding sheet are mounted over the top of the end windings of the first winding sheet. To allow such mounting, the second winding sheet 42 is bent in the region 61. As an alternative, both winding sheets can have their radial sections bent inwardly. The end windings have a thickness $T_2$ that is at least twice the radial sector thickness $T_1$. The increase in thickness between the active radial sector and the end windings takes place at bend area 61 over a radial length $L_1$ at the inner end windings 32 and a radial length $L_2$ at the outer end windings 33. The conductor thickness can preferably be from 0.006 to 0.250 inch with the gap clearances preferably of from 0.006 to 0.020 inch with a typical total air gap width between rotors, to accommodate the stators, of from 0.014 to 0.290 inch. The axial thickness and cross-sectional area of the active sector of the radial sectors of the conductor are determined by the current the coil will carry. This method of arranging circumferentially the active sectors of the coils, using two sheets laminated together, prevents the need to increase the thickness of the stator by stacking the coils directly on top of each other as commonly done in the prior art. As a result, the magnetic field produced by the permanent magnets is not weakened because the gap width does not have to be increased. Since the strength of the magnetic field remains the same, the torque and efficiency are not reduced, as is done with the prior art flat coil arrangement, and the tapered radial conductors increase the number of magnetic lines of force being crossed by the conductors.

An alignment fixture having pins that fit within the holes 37,39 of the coils can be used to position the coils and any supporting sheet around an alignment fixture. The alignment pins of a fixture and the alignment holes on the coils can be sized accurately so that the winding sheets can be placed over the pins to automatically position the winding sheets together. Once the sheets are aligned, they can be bent, laminated, insulated and then potted in an electrical insulator, such as epoxy, to form a rigid stator, if desired. The rigid stator can then be positioned between the magnets of rotors.

It is believed that the construction, operation and advantages of this invention will be apparent to those skilled in the art. It is to be understood that the present disclosure is illustrative only and that changes, variations, substitutions, modifications and equivalents will be readily apparent to one skilled in the art and that such may be made without departing from the spirit of the invention as defined by the following claims.

I claim:

1. A stator for use with a rotor that contains permanent magnets:

said stator having a center and an axial thickness and a radial extent;

a plurality of overlapping coils spaced and extending arcuately around said center of said stator;

said coils being formed of electrical conductors with each having an inner section and an outer section and two radial sections that extend between said inner section and said outer section with an open area formed within said inner, outer and radial sections;

said coils each having an axial thickness;

each said radial section having an active sector along a length of said radial section that has said permanent magnets of said rotor passed adjacent to it;

said overlapping coils including a first coil and a second leading coil and a third trailing coil;

one said active sector of said radial section of said second leading coil and one said active sector of said radial section of said third trailing coil fit within said open area of said first coil with said active sectors of said first coil and said second leading coil and said third trailing coil each having essentially the same said axial thickness and wherein said overlapped first coil and second leading coil and third trailing coil active sectors combined together have an axial thickness essentially equal to said axial thickness of each of said radial sectors of each of said coils;

said electrical conductors forming said active sectors of said radial sections are tapered so as to be wider as said conductors extend outwardly from said stator center.

2. The stator for use with a rotor that contains permanent magnets as in claim 1 wherein:

each said overlapping coil is formed by a conductor that is flat and wound in one plane.

3. The stator for use with a rotor that contains permanent magnets as in claim 1 wherein:

said plurality of overlapping coils extends around said center of said stator with said active sectors of said radial coil sections having the same axial thickness around said entire 360 degree extent of said stator.

4. The stator for use with a rotor that contains permanent magnets as in claim 1 wherein:

said coils are formed from a thin flat electrically conductive foil with said coils all the same thickness and said active radial sectors of said first coil and said second leading coil and said third trailing coil being essentially coplanar to each other.

5. The stator for use with a rotor that contains permanent magnets as in claim 1 wherein:

said coils are supported by carrier films.

6. The stator for use with a rotor that contains permanent magnets as in claim 5 wherein:

said coils and said carrier films are laminated together to form a unitary stator lamination.

7. The stator for use with a rotor that contains permanent magnets as in claim 1 wherein:

said active sectors of said radial sections of said second leading coil and said third trailing coil are bent inwardly so that said active sectors of said first coil and said second leading coil and said third trailing coil are all in essentially the same plane.

8. The stator for use with a rotor that contains permanent magnets as in claim 7 wherein:

said coil inner sections and outer sections have an axial thickness that is twice the thickness of said active sectors of said radial sections.

9. The stator for use with a rotor that contains permanent magnets as in claim 1 wherein:

said coils each have a beginning connector and an ending connector;

said beginning and said ending connectors have alignment holes for positioning said coils and for making electrical connections.

10. The stator for use with a rotor that contains permanent magnets as in claim 1 wherein:

said coils are formed from a thin flat electrically conductive foil wound in one plane so that said thickness of said active radial sectors of said coil radial sections are essentially coplanar;

said coil inner sections and outer sections have an axial thickness that is twice the thickness of said active sectors of said radial coil sections.

11. The stator for use with a rotor that contains permanent magnets as in claim 1 wherein:

said active sectors of said radial sections of said second leading coil and said third trailing coil are bent inwardly so that said active sectors of said first coil and said second leading coil and said third trailing coil are all in essentially the same plane;

said coils each have a beginning connector and an ending connector;

said beginning and said ending connectors each have alignment holes for positioning said coils and for making electrical connections;

said coil inner sections and outer sections combined have an axial thickness that is twice the thickness of said active sectors of said radial sections.

12. The process of forming the windings of a stator of claim 11 including:

bending said electrically conducting coils during said pressing and lamination of said first foil to said second foil so that said active sectors of said radial sections are formed essentially flat and coplanar and said coil outer sections and said coil inner sections remain essentially the collective thickness of said first foil and said second foil.

13. The process of forming the windings of a stator of claim 11 including:

chemically etching said flat electrically conducting foils to form said equally spaced radial array of coils.

14. The process of forming the windings of a stator of claim 11 including:

Photochemical machining said flat electrically conducting foils to form said equally spaced radial array of coils.

15. The stator for use with a rotor that contains permanent magnets as in claim 1 wherein:

said radial section active sectors have an axial thickness of from 0.006 to 0.250 inch.

16. A process of forming windings of a stator including:

providing flat electrically conductive foils;

providing each said flat electrically conducting foil with a supporting film;

forming equally spaced arrays of coils in said flat electrically conductive foils such that each of said coils has an inner section, an outer section and radial sections with an open area between said inner, outer and radial sections;

placing a first said flat foil with radial arrays of electrically conducting coils over a second said flat foil with radial arrays of electrically conducting coils such that one of said radial sections of a second leading coil on said second flat foil with radial arrays of conducting coils extends over one portion of an open area of a first coil on said first flat foil with radial arrays of electrically conducting coils and such that a radial section of a third trailing coil on said second flat foil with radial arrays of electrically conducting coils extends over another portion of said open area of said first coil on said first flat foil with radial arrays of electrically conducting coils adjacent to said second coil radial section;

pressing said first and said second flat foils with radial arrays of electrically conducting coils together and using said supporting films of said first and said second flat foils with radial arrays of electrically conducting coils to laminate said first and said second flat foils with radial arrays of electrically conducting coils together while concurrently bending an active sector of said second leading coil radial sections and an active sector of said third trailing coil radial sections into said open area of said first coil to bring said active sectors of said first coil and said second leading coil and said third trailing coil into a common plane and;

forming said equally spaced arrays of coils in said flat electrically conductive foils includes forming said radial conductor sections active sectors with electrical conductors that taper so as to be wider as said conductors extend outwardly.

17. The process of forming windings of a stator as in claim 16 including:

forming each of said coils with a beginning connector and an ending connector;

forming each of said coil beginning connectors and each of said coil ending connectors with connector holes;

using said connector holes of said coil beginning connectors and said coil ending connectors to align said first said flat foil with radial arrays of electrically conducting coils with said second flat foil with radial arrays of electrically conducting coils such that said one of said radial sections of said second leading coil on said second flat foil with radial arrays of conducting coils extends over said one portion of said open area of said first coil on said first flat electrically conducting foil coil and a radial section of said third trailing coil on said second flat foil with radial arrays of electrically conducting coils extends over another portion of said open area of said first coil on said first flat foil with radial arrays of electrically conducting coils adjacent to said second coil radial section prior to pressing said first and said second flat foils with radial arrays of electrically conducting coils to laminate them together and to bend said active foil sectors into said common plane;

using said beginning connector holes and said ending connector holes of said coil end connectors to attach electrical conductors to said coils.

* * * * *